Patented Oct. 24, 1939

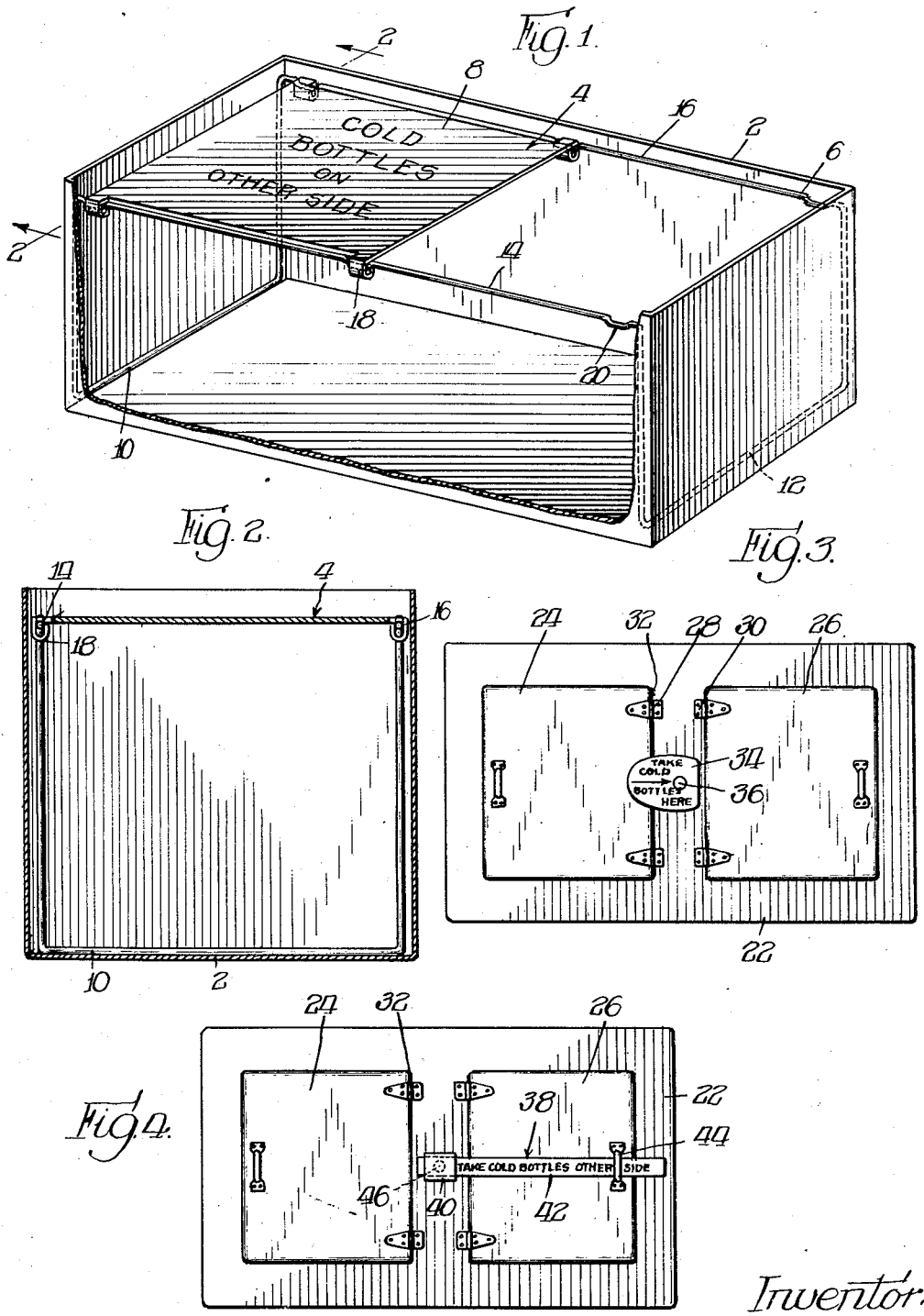

2,177,137

UNITED STATES PATENT OFFICE 2,177,137

REFRIGERATING DEVICE FOR BOTTLED BEVERAGES

Frederick E. Hazard, Chicago, Ill.

Application August 12, 1935, Serial No. 35,834

4 Claims. (Cl. 220—24)

The present invention relates to refrigerating devices, and more particularly to novel means therefor for assuring the individual removing a bottle of beverage or the like therefrom that the same is at the proper temperature.

It is generally well-known by both the wholesaler and retailer of bottled beverages that the sales of the particular beverage are determined primarily upon having the same at the proper temperature when dispensed. Heretofore in dispensing these bottled beverages from the ordinary refrigerating device, there was no assurance that the bottles taken therefrom were at the proper temperature inasmuch as bottles taken from the supply cases were inserted into the refrigerating device and indiscriminately mixed with bottles which had been in the device a sufficient time to become cool and at a palatable temperature. This factor has had considerable to do with the loss of sales in particular instances, and it is almost impossible to secure repeat sales with a device of this kind where a customer has unintentionally been sold a bottle of beverage which has not been cooled to the proper temperature.

It is therefore an object of the present invention to provide a device which prevents the seller of bottled beverages from indiscriminately mixing the bottles taken from the supply cases with the bottles which have been in the dispenser for the proper length of time to become sufficiently cool.

The present invention comprehends the idea of incorporating in a refrigerating device of any desired design suitable means which prevents the ready removal of bottled beverages which have not been in the device a sufficient length of time to become properly cooled. Such a device, in order to be practical, should preferably be adjustable to prevent the easy removal of bottled beverages from any portion of the refrigerating device containing insufficiently cooled bottles of beverage, but movable as desired to make these bottled beverages readily available when at the proper temperature for sale. The present invention contemplates such device.

Another object within the purview of the present invention is to provide a novel refrigerating device having a plurality of closure members whereby access may be had to a refrigerating tank or compartment and wherein suitable means is provided in association with certain of the closure members to permit opening of the same and to hold the others locked or in their closed position. In such a device, bottled beverages which have been cooled to the proper temperature may be disposed adjacent the unlocked closure member or members whereby the same cannot be readily removed from the refrigerating device until the locking means has been operated.

Other objects, features, capabilities and advantages are comprehended by the invention, as will later appear and as are inherently possessed thereby.

Referring to the drawing:

Figure 1 is a view in perspective of a refrigerating container incorporating a device made in accordance with the invention, the container being broken away to disclose the device more clearly;

Figure 2 is a transverse cross-sectional view taken in the plane represented by line 2—2 of Figure 1 of the drawing;

Figure 3 is a plan view of a refrigerating device embodying another form of the present invention; and Figure 4 is a plan view of a refrigerating device embodying still another form of the present invention.

Referring now more in detail to the drawing, a device made in accordance with the present invention is disclosed in Figures 1 and 2 of the drawing as being disposed within a container or tank 2 which may be suitably insulated, if desired, and may also be disposed within any suitable cabinet having one or more closure members whereby access may be gained to the tank 2. It is also understood that the tank 2, when used for refrigerating bottled beverages and the like, may be filled to a suitable level with liquid in which the bottled beverages are immersed, this liquid being cooled in any desired manner, preferably, however, by a refrigerating unit having expansion coils suitably associated with the tank or container 2.

In dispensing bottled beverages at the present time, no attempt has been made to properly separate in a refrigerating tank or compartment the bottles which have been in the refrigerator a sufficient length of time to cool to a proper temperature from those which have been insufficiently cooled to be palatable. Oftentimes the merchant or individual selling this bottled beverage merely reaches for bottles in a supply case and introduces them indiscriminately within the container or tank to replace those which have been sold. Until these bottles have been immersed in the liquid within the tank a sufficient length of time, the beverage is unpalatable, and if sold the customer is dissatisfied and such dispensing of bottled beverages discourages the customer from further attempts to secure a cold drink from such sources. This results in decreased sales of the particular beverages dispensed in this manner.

The present invention accordingly attempts to correct this situation by providing a device generally designated as 4, which may be inserted within the tank or container 2. The device 4 comprises a support 6 and a guard or closure member 8. The support 6 is of integral construction and may be formed from a rod, wire or the like, the same being bent to provide U-shaped legs 10 and 12 connected by the elongated rod portions 14 and 16 disposed therebetween, these rod portions being substantially in parallel relation and adjacent the sides of the tank or container 2. Mounted upon the rod portions 14 and 16 is the guard or closure member 8 which may be in the form of a solid plate, as shown in Figure 1 of the drawing, or, if desired, may be formed from expanded metal or of other reticulated construction. This guard or closure member 8 extends over a portion only of the opening to the tank 2 and is provided with lugs 18 which loosely embrace rod portions 14 and 16 whereby the same may be moved in the opening of tank 2.

As above explained, it is desirable to segregate those bottles of beverage which have been in the tank for some time from those which have just been introduced therein. The guard plate or closure member 8 serves to perfect this seggregation and is movable from one portion of the tank to the other over the rods 14 and 16. As will be clearly apparent when the guard or closure member 8 is in the position shown in Figure 1, bottles which are in the tank 2 and directly beneath the same cannot be readily removed from the tank. The dispensing of bottled beverages therefore takes place from that portion of the tank to the right, as shown in this figure, while the bottles beneath the member 8 are retained until the same have been in the tank a sufficient length of time to be cooled to a temperature to be palatable.

After the bottled beverages have been removed from the right-hand portion of the tank, as shown in Figure 1, this portion of the tank may be filled with bottles taken from a supply case, after which the guard or closure member 8 may be moved to cover this group of bottles. This provides an opening to the left-hand portion of the tank and bottles in that portion can be sold with some assurance that the same are at the proper temperature. In order to prevent easy displacement of the guard member from one position to the other, the rod portions 14 and 16 may be formed with a plurality of spaced depressed portions 20 adapted to receive the lugs 18 of the guard member, these depressed portions forming an abutment preventing sliding of the guard or closure member on the rod portions. Furthermore, if desired the guard member 8 may serve to display any desired advertising matter, or instructions may be placed thereon as to the proper dispensing of bottled beverages, as disclosed in this figure of the drawing.

In Figure 3 of the drawing, a modified form of the present invention is incorporated in a refrigerating device formed with a cabinet 22 having closure members 24 and 26 which are hinged, as at 28 and 30, to a central transverse member 32. Disposed within the cabinet 22 is a tank which may correspond to tank 2 of the embodiment shown in Figure 1 for receiving a liquid suitably cooled by refrigerating means and into which liquid the bottled beverages are immersed. In order to properly dispense beverages as above indicated, the present invention comprehends the idea of providing a locking member 34 eccentrically pivoted as at 36 to the transverse member 32. It will be noted that this locking member 34 is of such a shape and so mounted in respect to closure members 24 and 26 that when the same is in a position to lock or hold the closure member 24 in closed position, the other clourre member 26 can be opened. Bottles which have just been introduced into the refrigerating device adjacent the closure member 24 cannot be readily removed because of locking member 34, and instructions may be inscribed on the top of the locking member directing the individual desiring a bottled beverage to open closure member 26 and remove such beverage from the part of the tank adjacent thereto. Locking member 34 may be turned so as to lock closure member 26 in closed position to permit closure member 24 to be opened.

Still another form of the present invention is embodied in Figure 4 in a refrigerating device corresponding to the refrigerating device shown in Figure 3, this device including cabinet 22, closure members 24 and 26 suitably hinged to a transverse member 32 of the cabinet, and a locking means 38. This locking means comprises a sleeve 40 suitably mounted on the transverse member 32 within which is slidably mounted an elongated locking member 42. This locking member 42, as shown in Figure 4 of the drawing, is disposed above the closure member 26, thus preventing opening of the same. If desired, however, and the bottled beverages adjacent the closure member 26 are at the proper temperature for dispensing, the locking member 42 may be slid through sleeve 40 into a corresponding position with respect to closure member 24. In order to prevent removal or displacement of the locking member 42, the same can be constructed to engage beneath the handle 44 of either of the closure members and may be engaged by any suitable locking mechanism, conventionally shown as 46, disposed in the sleeve 40. Locking means 38 serves in the same capacity as locking member 34 of the embodiment shown in Figure 3 and similarly assures the purchaser that he will receive a bottle of beverage which is at the proper temperature and palatable.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In a refrigerating device, the combination of a container for bottled beverages and the like, said container having an opening, a support disposed in said container comprising spaced substantially parallel rods extending across said container, a guard member movably mounted on said rods and extending over a portion of said opening, said rods having spaced depressed portions, and lugs on said member normally engageable in said depressed portions to prevent movement thereof.

2. In a refrigerating device, the combination of a container for bottled beverages and the like, said container having an opening, a support disposed in said container comprising an integral wire frame having oppositely disposed legs and connecting rod portions, a guard member movably mounted on said rod portions and extending over a portion of said opening, said rod portions having depressed portions, and lugs on said member normally engageable in said depressed portion to prevent movement thereof when in the desired position in said opening.

3. In combination, a supporting member adapted for use in refrigerating devices having spaced substantially parallel members, a guard member movably mounted on said parallel members and disposed over a part of the area defined by said parallel members, said parallel members having spaced depressed portions, and lugs on said guard member normally engageable in said depressed portions to prevent movement thereof.

4. In combination, a supporting member adapted for use in refrigerating devices comprising an integral wire frame having oppositely disposed legs and connecting rod portions, a guard member movably mounted on said rod portions and disposed over a part of the area defined by said rods, said rod portions having depressed portions, and lugs on said members normally engageable in said depressed portion to prevent movement thereof.

FREDERICK E. HAZARD.